(12) United States Patent
Bertsch et al.

(10) Patent No.: US 7,078,872 B2
(45) Date of Patent: Jul. 18, 2006

(54) SYSTEM AND METHOD FOR CONDITIONING A SIGNAL

(75) Inventors: Robert P. Bertsch, Edwards, IL (US); Brian D. Kuras, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/448,985

(22) Filed: May 30, 2003

(65) Prior Publication Data

US 2004/0239281 A1 Dec. 2, 2004

(51) Int. Cl.
*G05B 11/42* (2006.01)

(52) U.S. Cl. ............ 318/310; 318/800; 318/805; 318/807; 318/812; 318/814; 318/820; 375/240; 375/240.2; 375/229; 375/338; 702/189; 702/197; 708/322; 708/323

(58) Field of Classification Search ......... 388/800, 388/805, 812, 814, 820, 906; 318/807, 616, 318/800, 805, 812, 814, 820; 375/229–336, 375/240–240.2; 702/189–197; 333/17.1; 708/322–323

See application file for complete search history.

(56) References Cited

U.S. PATENT DOCUMENTS

| | | | |
|---|---|---|---|
| 4,010,717 A | 3/1977 | Taplin | |
| 4,651,698 A | 3/1987 | McDermott et al. | |
| 4,664,083 A | 5/1987 | Nix et al. | |
| 4,988,935 A * | 1/1991 | York | 318/568.18 |
| 5,115,418 A * | 5/1992 | Shimada | 318/616 |
| 5,150,317 A * | 9/1992 | Countryman | 708/300 |
| 5,265,270 A * | 11/1993 | Stengel et al. | 455/343.2 |
| 5,265,570 A | 11/1993 | Schnaibel et al. | |
| 5,283,811 A * | 2/1994 | Chennakeshu et al. | 375/233 |
| 5,349,864 A | 9/1994 | Park et al. | |
| 5,490,121 A * | 2/1996 | Gardner et al. | 367/83 |
| 5,606,495 A | 2/1997 | Jaidka | |
| 5,654,765 A * | 8/1997 | Kim | 348/614 |
| 5,666,935 A | 9/1997 | Kato | |
| 5,787,848 A | 8/1998 | Stefanopoulou et al. | |
| 5,825,150 A * | 10/1998 | Kachi et al. | 318/610 |
| 5,862,507 A | 1/1999 | Wu et al. | |
| 5,869,945 A * | 2/1999 | Ha et al. | 318/600 |
| 5,994,868 A * | 11/1999 | Takeuchi et al. | 318/616 |
| 6,002,713 A * | 12/1999 | Goldstein et al. | 375/222 |
| 6,006,155 A | 12/1999 | Wu et al. | |
| 6,223,111 B1 | 4/2001 | Cronin et al. | |
| 6,266,597 B1 | 7/2001 | Russell et al. | |
| 6,404,809 B1 * | 6/2002 | Zhang | 375/232 |
| 6,417,642 B1 * | 7/2002 | Ichikawa | 318/638 |
| 6,427,445 B1 | 8/2002 | Isaac et al. | |
| 6,441,506 B1 | 8/2002 | Nakashima | |
| 6,552,509 B1 * | 4/2003 | Veltman | 318/807 |
| 6,565,479 B1 * | 5/2003 | Fattic et al. | 477/3 |

(Continued)

FOREIGN PATENT DOCUMENTS

JP 11196598 A * 7/1999

*Primary Examiner*—Rina Duda
*Assistant Examiner*—Erick Glass
(74) *Attorney, Agent, or Firm*—Steve M. Hanley

(57) ABSTRACT

A method of conditioning a signal being communicated between a system to be controlled and a controller may include monitoring an actual output signal and conditioning the actual output signal. The method also includes determining the difference between the actual output signal and the condition signal and causing the actual output signal to be filtered based on the relationship between the difference between the actual output signal and the conditioned signal.

9 Claims, 5 Drawing Sheets

U.S. PATENT DOCUMENTS

| | | | |
|---|---|---|---|
| 6,694,280 B1 * | 2/2004 | Lai | 702/117 |
| 6,798,832 B1 * | 9/2004 | Nakata et al. | 375/233 |
| 6,807,229 B1 * | 10/2004 | Kim et al. | 375/233 |
| 6,865,588 B1 * | 3/2005 | Ling et al. | 708/322 |
| 2001/0008988 A1 | 7/2001 | Russell et al. | |
| 2001/0020789 A1 | 9/2001 | Nakashima | |
| 2001/0032465 A1 | 10/2001 | Terry et al. | |
| 2002/0029772 A1 | 3/2002 | Isaac et al. | |
| 2002/0082140 A1 | 6/2002 | Suehiro et al. | |
| 2002/0122519 A1 | 9/2002 | Douglas et al. | |
| 2004/0085034 A1 * | 5/2004 | Kuras et al. | 318/432 |

* cited by examiner

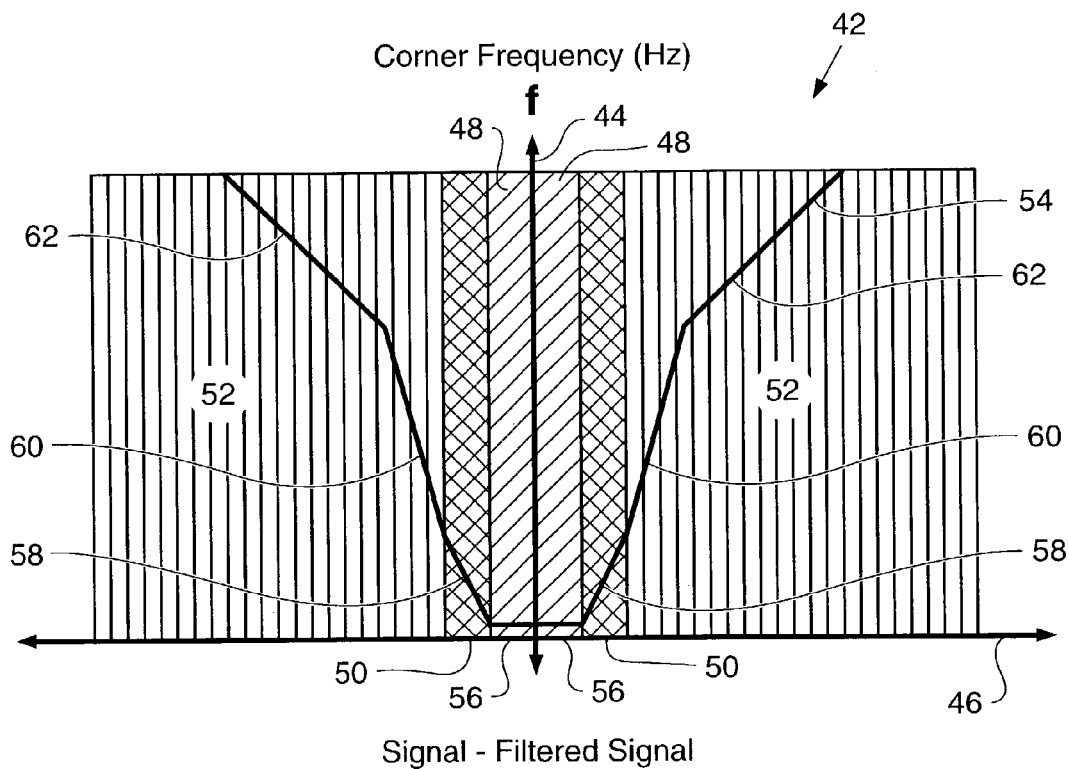
Fig. 2
 "Noise" –
 Unknown "Noise" or "True Signal"
 "True Signal" –

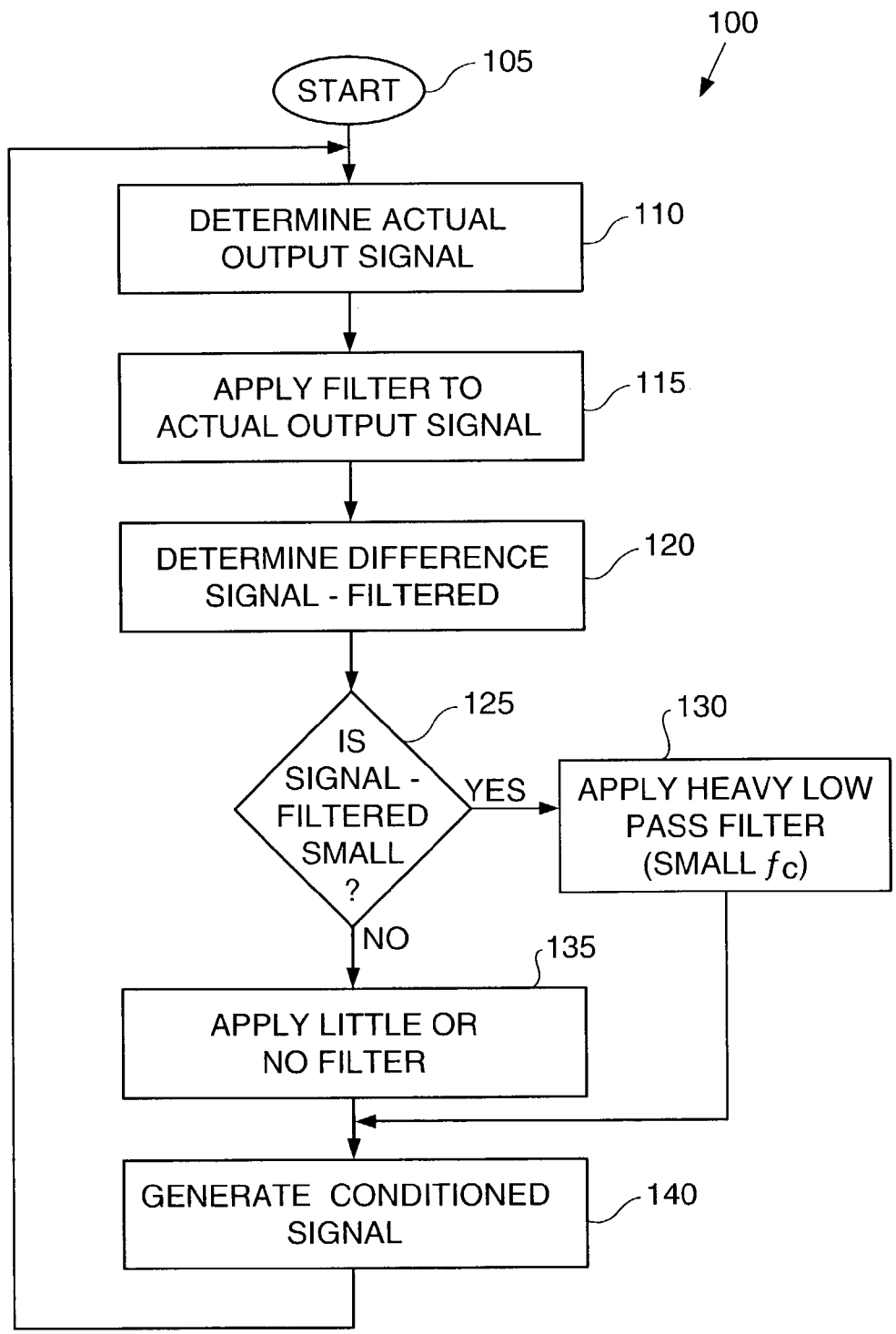

Fig-4-
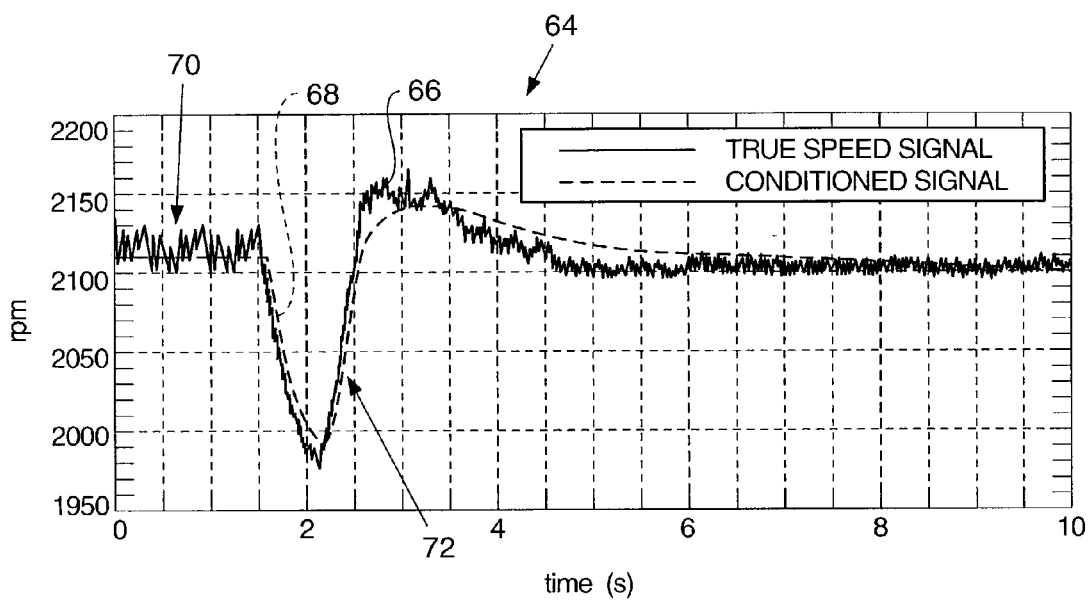
Fig-5-
| Type of Controller | Response Control Requirement | Ability to differentiate between "noise" vs. "true signal" | Contribution Effort | |
|---|---|---|---|---|
| | | | Filter | Closed Loop PID Deadband |
| Direct PID Control | High or Fast | N/A | 0% - 10% | 90% - 100% |
| | Medium | Poor<br>Good | 5% - 35%<br>40% - 60% | 65% - 95%<br>40% - 60% |
| | Low or Slow | Poor<br>Good | 50% - 70%<br>60% - 95% | 30% - 50%<br>5% - 40% |

SYSTEM AND METHOD FOR CONDITIONING A SIGNAL

TECHNICAL FIELD

The present disclosure relates generally to a system and method for filtering a signal and, more particularly, to a system and method for implementing a signal conditioner that is varied based on signal posture.

BACKGROUND

Many control systems include multiple sensors to monitor various system parameters and thereafter communicate this system information back to the controller. Each sensor generates an output signal, which is read by the controller, in preparation for subsequent system control. However, it is often difficult to discern the true signal from the noise if the noise includes a similar frequency as compared to the true signal. One known solution includes utilizing a band pass filter to filter noise at a first frequency and thereafter allowing the true signal frequency, which is at a second differing frequency, to pass through the filter.

Known filtering techniques include utilizing a band pass filter to filter out noise which may be characterized within a first frequency band and to allow the true signal, which may be characterized within a second and different frequency band, to pass through the filter. However, band pass filters are often not acceptable since the frequency of noise may be similar to the frequency of the true signal when the signal is prone to fluctuation. Moreover, since the band pass filter is a passive element its effectiveness in providing a quality signal is significantly dependent on the range of signals being filtered.

For example, U.S. Patent Application Publication No. US 2001/0020789, dated Sep. 13, 2001 to Nakashima, discloses utilizing look-up tables or maps identifiably based on desired motor/generator torque to provide the appropriate level of signal filtration. The signal from the torque sensor is input into a response characteristic compensation section of the motor/generator controller, such as a first order low pass filter that transmits or passes signals at a frequency below a given cutoff frequency, and attenuates signals with a frequency above the given cutoff frequency. Unfortunately, if the torque output signal is similar in frequency to that of the system noise, then the filter is likely to become less effective.

Furthermore, many output signal types for use on high performing systems, such as torque control of an electric motor, for example, require the ability to aggressively control the motor to obtain certain performance mandates. In response to the need to provide aggressive response to the speed/torque signal of an electric motor, the electric motor tends to experience high frequency torque oscillations, which can result in instability and/or surging of the motor. Moreover, high frequency oscillations may cause undesirable operational noise, reducing the useful life of the motor, and/or adversely effecting operator comfort in instances where the electric motor is utilized to animate a work machine, for example.

The present invention addresses one or more of the aforementioned problems.

SUMMARY OF THE INVENTION

In accordance with one exemplary aspect of the disclosure, a method for conditioning a signal is provided. The method may include conditioning a signal being communicated between a system to be controlled and a controller. The method may further include monitoring an actual output signal, conditioning the actual output signal, determining the difference between the actual output signal and the condition signal, and causing the actual output signal to be filtered based on the relationship between the actual output signal and the conditioned signal.

In accordance with another exemplary aspect of the disclosure, a method for conditioning a signal is provided. The method may include conditioning a signal being communicated between a system to be controlled and a controller. The method may further include monitoring an actual output signal, conditioning the actual output signal, determining the difference between the actual output signal and the condition signal, and applying at least one of a filter and closed loop control to the actual output signal based on the relationship between the actual output signal and the conditioned signal.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this disclosure, illustrate several exemplary embodiments of the invention and, together with the description, serve to explain the principles of the invention. In the drawings.

FIG. 2 is a table showing an exemplary corner frequency chart accordance with an exemplary aspect of the invention;

FIG. 3 is a flow chart of an exemplary operation for conditioning a signal in accordance with the invention;

FIG. 4 is a graph showing the unconditioned signal and the corresponding conditioned signal for a period of time;

FIG. 5 is a table showing an exemplary tuning scheme in accordance with an exemplary aspect of the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
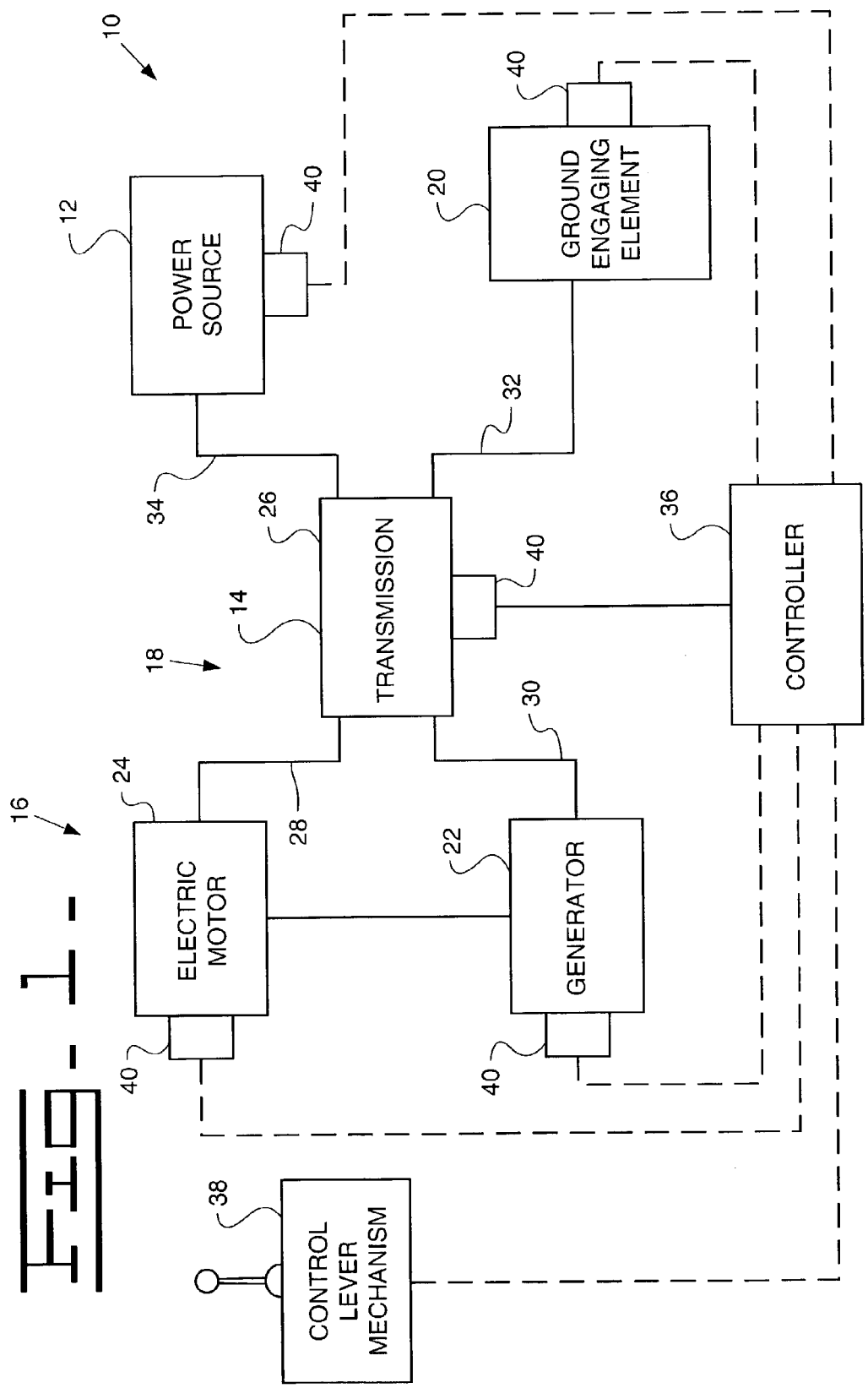
FIG. 1 is a schematic view of a power module system in accordance with an exemplary aspect of the invention.

Referring to FIG. 1, a work system 10 may be equipped with a power source 12 such as an internal combustion engine, for example, and a transmission 14. The transmission 14 may have neutral, a plurality of forward gear ratios, and one or more reverse gear ratios; however, it also include a wide variety of transmission types such as a continuous variable transmission (e.g., hydrostatic, hydro-mechanical, direct electric, electro-mechanical, etc.) or other transmission configuration known by those having ordinary skill in the art of transmission technology.

The transmission 14 may be a hybrid transmission which divides engine torque between an electro-mechanical transmission 16 and a mechanical transmission 18. The transmission 14 may be used to propel a machine (not shown) via a ground-engaging element 20. The ground-engaging element 20 may include, for example, traction wheels or tracks.

The electro-mechanical transmission 16 may include a power generator 22, for example, an electric generator, operably coupled to electric motor(s) 24. The mechanical transmission 18 may include a planetary gearing mechanism 26.

The motor 24 may include an output shaft 28 operably coupled to the planetary gearing mechanism 26, and the planetary gearing mechanism 26 may be operably coupled to an input shaft 30 of the power generator 22 as is understood by those of ordinary skill in the art. The planetary gearing mechanism 26 may include one or more gears (not shown), clutches (not shown), and shafts, including an output shaft 32 coupled to the ground-engaging element 20. The engine 12 may include an output shaft 34 operably coupled to the planetary gearing mechanism 26.

The work system 10 may include a controller 36 to implement closed loop control of the system 10. The control may include proportional, proportional plus integral, or proportional plus integral and differential, as is customary. The controller 36 may be embodied in one or more microprocessors. Numerous commercially available microprocessors can be adapted to perform the functions of the controller 36. It should be appreciated that the controller 36 could be readily adapted to control operation of the engine 12 and the transmission 14. The controller 36 may be electrically coupled with a control lever mechanism 38, for example, an operator-controlled lever. The control lever mechanism 38 may be movable to input to the controller 36 a desired ground speed of the machine associated with the ground-engaging element 20.

The work system 10 may also include one or more sensors 40 electrically coupled to the controller 36. The sensors 40 may directly or indirectly sense output of any of the signal sources such as, for example, the motor 24, engine speed, engine load, and/or ground speed of the ground-engaging element 20. The controller 36 may be configured to process and/or monitor signals received from the sensors 40.

Each sensor 40 provides an output signal to the controller 36 which, in turn, adapts for differing performance characteristics of the sensor 40. Generally, a band-pass filter may be employed to improve the output signal received by the controller, however this may be ineffective if the noise to be filtered is similar in stature relative to the true signal.

Referring to FIG. 2, a corner frequency chart 42, which is specific to the system being monitored and controlled, is provided and is representative of one of the signal outputs such as engine speed, for example. The corner frequency chart 42 includes a corner frequency axis 44 and a variance axis 46. The variance may be defined as the difference between the true sensed signal and the filtered signal. A first region 48, located along and adjacent to the corner frequency axis 44, is representative of signals primarily made up of noise. A second region 50, which extends along the length of the corner frequency axis 44, is indicative of signals which are largely mixed (i.e., mix between true and noise) and cannot readily be defined. Finally, a third region 52 is provided outside of both the first and second regions 48 and 50 and is indicative of a true signal being output by the sensor 40.

In an exemplary embodiment, a corner frequency or tuning function 54 may be provided as an estimation to determine whether a signal is noise. The corner frequency function 54 includes a first slope 56, having little or no corner frequency value and is predominately used to heavily filter out noise (enclosed within the first region 48). A second and a third slope 58, 60 of the function 54 are respectively enclosed by the second region 50 (mixed noise and true signal) and third regions 52 (true signal). A fourth slope 62 of the corner frequency function 54 is fully enclosed by the outermost region 52 and is predominately a true signal and thus the corner frequency of the low pass filter is set high so as to not filter any of the true signal and thus the corner frequency of the low pass filter is set high so as to not filter any of the true signal.

Referring to FIG. 3, an exemplary operation 100 of the work system 10 is described. The operation 100 commences at step 105 and proceeds to step 110 where the controller 36 receives an actual output signal indicative of a system signal such as electric motor speed, for example, for control of ground speed of the ground engaging element 20, that is, if the work system 10 were employed on a mobile machine for instance. Alternatively, the controller 36 may receive a actual output signal indicative of speed of the power source 12. It is envisioned that the exemplary operation 100 may be used singularly or in multiple instances in accordance with any closed loop control system having an actual output signal, such signal being known to those having ordinary skill in the art of control system technology.

Control then continues to step 115, where the filter is applied to the signal. Thereafter in step 120, the controller 36 determines the difference between the actual and the filtered signals. The corner frequency table 42 (FIG. 2) now may be utilized since the signal frequency and the difference between the filtered and actual frequencies (variance) is known.

Next, in step 125, the controller 36 determines whether the variance between the actual signal and the filtered signal is small. If, in step 125, the controller 36 determines that the variance is small, control continues to step 130. Otherwise, if the variance is not small then control jumps to step 135.

In step 140, the controller 36 establishes a conditioned signal based on the status of the actual signal relative to the corner frequency function 42. That is, if the variance is negligible the signal is conditioned by significant application of the filter. In contrast, if the variance, for a particular corner frequency, results in the signal having an unknown characteristic, then the signal is filtered, albeit to a lesser degree than if it were noise. However, as the corner frequency of the signal increases, and additionally, the variance increases, such a signal is more clearly classifiable as a true signal and consequently the filter is not employed.

As the control proceeds, in step 140, the controller 36 progresses the control back to step 110 wherein a new actual signal may be determined and a new variance calculated in preparation for continued signal conditioning.

Referring to FIG. 4, it may be seen that the true signal closely relates to the conditioned signal when operation 100 is being employed to control the speed of an engine, for example. Trace 64 includes a true speed signal 66 and a conditioned speed signal 68. A first region 70 (approximately 2110 RPM), which is indicative of noise control (heavy filter or low corner frequency), is provided between zero and 1.5 seconds. A second region 72 is indicative of a response or true signal control (lighter or no filtering or high corner frequency) and is provided between 1.5 and 6 seconds.

In addition to employing a filter which varies based on previous signal posture, it is envisioned that any closed loop control known to those having ordinary skill in the art may be employed in combination with the present system. However, one exemplary control scheme may include establishing a deadband around the command for aggressively tuning the system when a true signal is detected.

Figure 6:
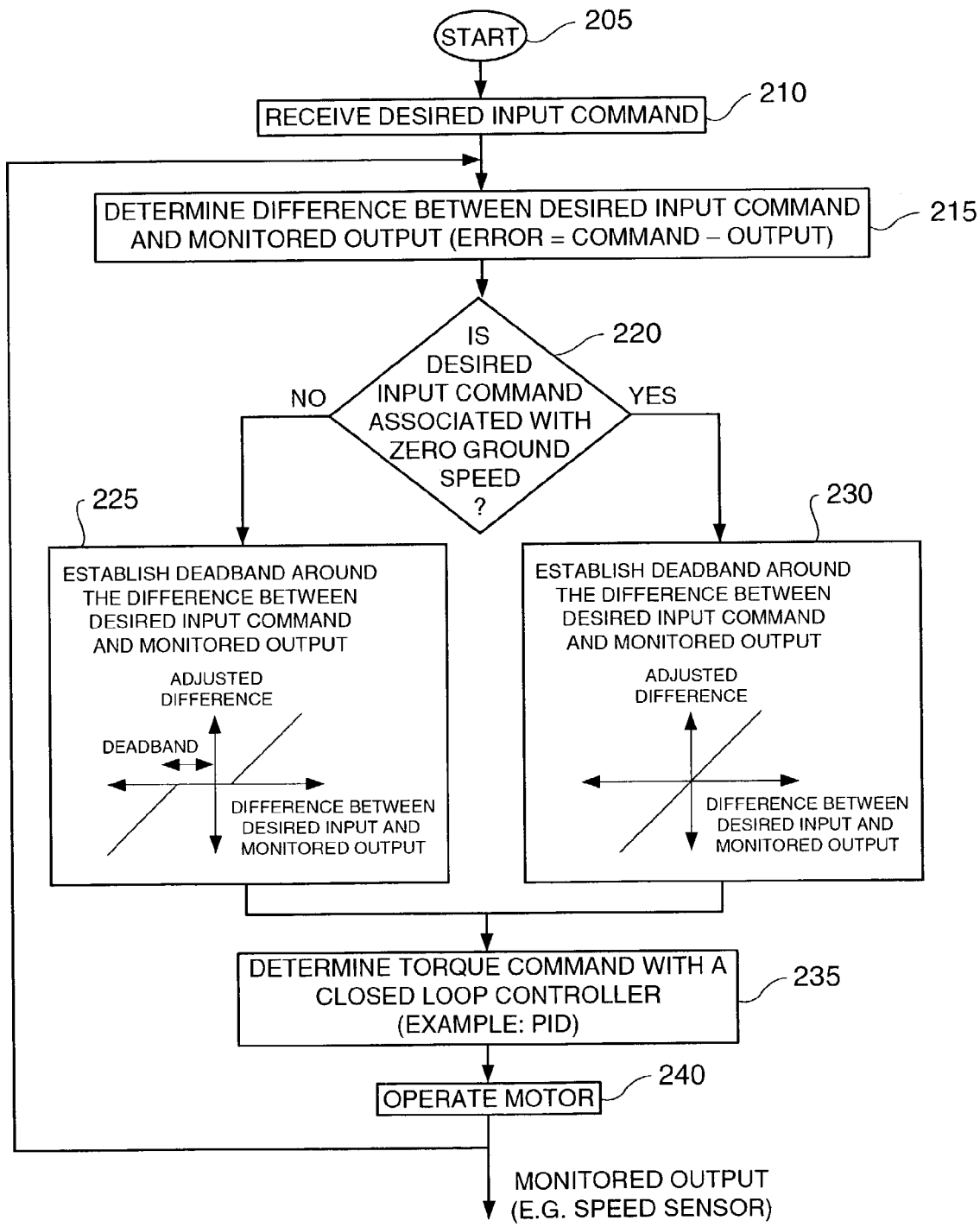
FIG. 6 is a flow chart of a second exemplary operation for conditioning a signal in accordance with the invention.

Referring to FIG. 6, operation 200 utilizing closed loop PID deadband control will be described. The system 10 includes the controller 36 to implement closed loop control of the system 10. The control may be proportional, proportional plus integral, or proportional plus integral and differential. The controller 36 may be embodied in one or more microprocessors. Numerous commercially available microprocessors can be adapted to perform the functions of the controller 36. It should be appreciated that the controller 36 could be readily adapted to control operation of the engine 12 and the transmission 14 or other system utilizing an output signal for the basis of control.

An exemplary operation 200 of the work system 10 commences at step 205 and proceeds to step 210 where the controller 36 receives desired input command, indicating a desired output of the motor 24, for example, to produce a steady-state ground speed of the ground engaging element 20.

Control then continues to step 215, where the controller 36 determines the control error or the difference between the desired input command and the monitored output of the motor 24.

Next, in step 220, the controller 36 determines whether the desired output of the motor 24 is associated with a zero ground speed of the ground engaging element 20. If, in step 220, the controller 36 determines that the desired output of the motor 24 is not associated with a zero ground speed of the ground engaging element 20, control continues to step 225. Otherwise, if the desired output of the motor 24 is associated with a zero ground speed of the ground engaging element 20, control jumps to step 230.

In step 225, the controller 36 establishes a deadband around the error or the difference between the desired input command and the monitored output. The magnitude of the deadband may be empirically determined from the system noise and/or poor resolution of the controller 36 and/or sensors 40.

In step 230, the controller does not apply a deadband around the error or the difference between the desired input command and the monitored output. This deadband is eliminated as precise control may be needed when the operator is expecting or requesting zero ground speed.

As the control proceeds, in step 235, the controller 36 determines a torque command (from adjusted difference or adjusted control error) or other suitable exemplary command and sends this torque command to step 240 for operating the motor 24 to generate the desired motor output, for example, to attain the desired steady-state ground speed.

Exemplary operation of the work system 10 utilizing the closed loop PID deadband control commences as an operator moves the control lever mechanism 38 to command a desired ground speed of the ground-engaging element 20. The controller 36 determines a desired output of the motor 24 required to generate the desired ground speed. When accelerating or decelerating, the controller 36 varies the torque command for operating the motor 24 based on the monitored output of the motor in a feedback control system, for example, a closed loop control system.

Once the ground-engaging element 20 has reached the desired speed, it may no longer be desirable for the controller 36 to continuously vary the torque command based on minimal differences between the desired output of the motor 24 and the monitored output of the motor 24. Instead, it may be more desirable to filter out the minimal differences that may likely be attributable to poor resolution of or noise in the system 10, including the controller 36, and/or the sensors 40.

The controller 36 may be operating under predominately or exclusively proportional control when, for example, the motor 24 is an electric motor. In many industrial applications, the overall gain (or proportional gain) of the controller may be required to be high due to the response requirements of the machine. Therefore, a small control error possibly attributable to poor resolution or noise may cause the controller 36 to continuously vary the torque command to attempt to attain the desired steady-state output. As a result, the motor output may over-respond and continuously oscillate around the desired steady state output. In addition, it is possible, depending on the operational frequency of the controller 36 and the necessary frequency response determined by the controller, the system 10 may over-respond and become unstable. By establishing a deadband around the torque command for attaining the desired steady state output of the motor, the controller 36 is forced not to respond to small control errors possibly attributable to the poor resolution or noise.

Furthermore, the controller 36 may be configured to remove the deadband where small control errors should be considered. For example, when an operator commands negligible ground speed of the ground-engaging element 20, the controller 36 determines an appropriate motor output. Since it is not desirable for the ground-engaging element 20 and an associated machine to creep, zero steady state error is required. Therefore, when the desired output of the motor is associated with zero ground speed of the ground-engaging element 20, the controller 36 does not implement the deadband. As a result, the controller 36 may continuously vary the torque command for operating the motor 24 to attain the desired motor output.

The operation 200 of the work system 10, such as that employed to control the electric motor, for example, may reduce instability and/or surging of the work machine possibly associated with poor resolution of and/or noise in the system 10. Further, undesirable operational noise may be significantly reduced and, as a result, the useful life of the motor may be extended in addition to providing improved operator comfort. Creep of the ground-engaging element 20 may also be beneficially reduced since substantially zero steady state error may be obtained when zero ground speed is commanded.

Referring to FIG. 5, it may be seen that a blend of filtration, pursuant to operation 100, and PID deadband control, pursuant to operation 200, may be established based on response control requirements and on the ability to differentiate between noise and the true signal (value of the variance parameter). For instance, if there is little response required and the noise can be differentiated from the true signal (variance between the signal and the filtered value is negligible), then the full output of the filter is applied. Conversely, if the noise cannot be differentiated well (variance between the signal and the filtered value is significant) and a fast or high response control requirement is warranted, then the filter is negated (or significantly reduced) and full PID control with deadband is employed. When the contribution effort comprises a blend of PID control with deadband and filtration effectiveness for a particular response requirement, then exemplary contribution efforts may be provided as seen in FIG. 5.

INDUSTRIAL APPLICABILITY

In operation of work system 10 (FIG. 1), pursuant to operation 100 (FIG. 3), as the operator moves the control lever mechanism 38 to command a desired output for the work system 10, such as the speed of the power source 12, and/or the speed of the ground engaging element 20, the output signal is developed and depending on its condition or posture, the filter will be applied.

The operation which conditions the output signal using substantially all of the filter and falls within the first region 48 (FIG. 2) of the corner frequency chart 42 will now be described. Since the noise associated with such operation typically has a given variance band of approximately 10 to 15 RPM during steady-state conditions, the controller deems the variance to be characterized as "small" (box 125 of FIG. 3). Then, the signal is heavily filtered with a corner frequency relatively small (the relatively small nature of the corner frequency is system dependent but typically will be less than 0.5 Hz, for example).

The operation which conditions using substantially none of the filter, such signal type falling within the third region 52 of the corner frequency chart 42, will now be described. When the output signal has changed such that it is larger that the typical noise or variance, then the speed signal is considered to be substantially true. Consequently, when the variance is determined to be significant, the speed signal is thereafter lightly filtered with a corner frequency relatively high (depending on the specific system or machine application which may be 7 to 8 Hz, for example).

Operation which is clearly neither noise nor a true signal falls within the second region 50 of the corner frequency chart 42 and includes the status of unknown (signal being a mixture of both noise and a true signal). When the output signal is changed such that its variance is larger that the typical noise, then the speed signal is considered to be unknown and an intermediate amount of filtration may be applied to condition such signal. Alternatively, the unknown signal may be left unfiltered as a conditioning alternative and the subsequent signal may be subsequently interrogated to determine its disposition so that a suitable signal conditioning may be later applied. The first, second, third and fourth slopes 55, 58, 60 and 62 of the corner frequency function 54 may be stored within the controller as dividing lines for determination of a signal's status or posture.

Contribution of Filter and Closed Loop PID Deadband Control

Referring to FIG. 5, the work system 10 (FIG. 1) may be operated pursuant to a blended combination of operation 100 (filter) and operation 200 (PID control) to, inter alia, produce the desired control system over a wide operating range of the system 10. Notably, the tuning requirement may be defined as the amount that each individual algorithm (100 and 200) will contribute to eliminating the system from over-responding to the false or noisy feedback signals while allowing the system to respond to the true signals.

When substantially all of the contribution effort is provided by the closed loop PID deadband control 200, the PID deadband control 200 is substantially responsible for eliminating over-responsive signals, false signals and noisy feedback. Notably, a substantially true signal has been detected and the system response and performance is most effective with PID control without interference from band filtering.

Conversely, when substantially all of the contribution effort is provided by the filter, the filter control 100 is substantially responsible for eliminating over responsive signals, false signals and noisy feedback. Notably, a substantially steady-state signal has been detected and, accordingly, signal conditioning to provide high response is not warranted. Rather, to prevent over-response of the signal, the filter may be employed to prevent false and undue system responses.

It may be seen that the contribution of filter and PID control with deadband may be blended to obtain a performance conditioning based on the response control requirement and the ability to differentiate between noise and the true signal. For instance, if a high or fast response were warranted then the significant contributor would be the PID control with deadband. However, if medium response control were required and the ability to differentiate the signal were poor then a filter range between 5–35% combined with a PID control with deadband range between 65–95% would be effective. Notably, as the ability to differentiate the noise from the true signal increases the contribution effort of the filter is increased (for example 50% filter, 50% PID control with deadband for medium response control). Further, if slow response control is a requirement and the ability to differentiate the signal is poor then a filter range between 50–70% combined with a PID control with deadband range between 30–50% would be effective. Notably, as the ability to differentiate the signal increases the contribution effort of the filter is increased (for example, as high as 95% filter and 5% PID control with deadband for slow response control).

It will be apparent to those skilled in the art that various modifications and variations can be made in the disclosed system and method for conditioning a signal without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A method of conditioning a signal being communicated between a system to be controlled and a controller, the method comprising:

monitoring an actual output signal;

filtering the actual output signal by using at least one filter to provide a filtered signal;

determining a difference between the actual output signal and the filtered signal; and setting at least one characteristic parameter of the at least one filter based on the difference between the actual output signal and the filtered signal, wherein the at least one characteristic parameter includes a corner frequency of the at least one filter.

2. The method according to claim 1, wherein the corner frequency is based on a corner frequency function defined to include:

a first region representing noise signals;

a second region representing mixed noise and true signals; and a third region representing true signals.

3. The method according to claim 1, wherein the setting further includes:

decreasing the corner frequency of the at least one filter such that the actual signal is significantly filtered by the at least one filter if the difference is less than a predetermined value; and increasing the corner frequency of the at least one filter such that the actual signal passes through the at least one filter without filtering if the difference is greater than the predetermined value.

4. The method according to claim 1, further including:

processing the actual output signal by applying the at least one filter.

5. A method of controlling a motor, the method comprising:
- monitoring an actual output signal of the motor;
- filtering the actual output signal of the motor by using a filter to provide a filtered signal;
- determining a difference between the actual output signal and the filtered signal;
- setting a corner frequency of the filter based upon the determined difference; and
- causing the actual output signal to be filtered by the filter.

6. The method according to claim 5, wherein causing the actual output signal to be filtered further includes applying at least one of the filter and a closed loop control to the actual output signal based on the determined difference.

7. A method of conditioning a signal being communicated between a system to be controlled and a controller, the method comprising:
- monitoring an actual output signal;
- filtering the actual output sIgnal to provide a filtered signal;
- determining a difference between the actual output signal and the filtered signal; and
- processing the actual output signal based on the difference between the actual output signal and the filtered signal,
- wherein the filtering further includes: filtering the actual signal based on a corner frequency function defined to include:
- a first region representing noise signals;
- a second region representing mixed noise and true signals; and
- a third region representing true signals.

8. A method of conditioning a signal being communicated between a system to be controlled and a controller, the method comprising:
- monitoring an actual output signal;
- filtering the actual output signal to provide a filtered signal;
- determining a difference between the actual output signal and the filtered signal; and
- applying both a filter and closed loop control to the actual output signal based on the difference between the actual output signal and the filtered signal,
- wherein the closed loop control consists of Proportional Integral Differential (PID) closed loop control with deadband.

9. A method of conditioning a signal being communicated between a system to be controlled and a controller, the method comprising:
- monitoring an actual output signal;
- filtering the actual output signal to provide a filtered signal;
- determining a difference between the actual output signal and the filtered signal; and
- applying both a filter and closed loop control to the actual output signal based on the difference between the actual output signal and the filtered signal,
- wherein the closed loop control includes:
- determining a difference between the actual output signal and a desired input command signal;
- establishing a deadband around the difference between the actual output signal and the desired input command signal; and
- applying the closed loop control to the actual output signal based on a relationship between the deadband and the difference between the actual output signal and the desired input command signal.

* * * * *